Patented July 8, 1941

2,248,346

UNITED STATES PATENT OFFICE 2,248,346

METHOD FOR THE RECOVERY OF PHYTOSTEROL

Frederick H. Gayer and Charles E. Fawkes, Chicago, Ill., assignors to Continental Research Corporation, Chicago Heights, Ill., a corporation of Illinois No Drawing. Application July 17, 1939, Serial No. 284,914

10 Claims. (Cl. 260—97.5)

This invention relates to an improved method for the isolation and recovery of phytosterol from sources of natural occurrence thereof, or from products obtained from a natural source.

Our invention is especially adapted to the recovery of phytosterol from tall oil, and more particularly to the recovery thereof from certain precipitates or concentrates resulting from the refining of crude tall oil, as for example the precipitates or sludges obtained by the sulphuric acid refining treatment of tall oil as set forth in our co-pending application Serial No. 169,656, filed October 18, 1937.

Tall oil, a by-product of sulfate paper manufacture, is an ill-smelling, dark substance, composed preponderantly of higher fatty acids and resin acids, which together make up about 80 to 90 per cent of its weight. The balance consists of coloring substances (oxy-resin acids), unsaponifiable matter, and other impurities. The unsaponifiable matter is composed of hydrocarbons and cyclic alcohols belonging to the group of phytosterols of which tall oil is an unusually rich source.

One general method for the removal of the coloring matter and a large portion of the unsaponifiable matter including the phytosterol, from tall oil, as set forth in our aforementioned co-pending application is to dissolve the tall oil in a petroleum solvent, cool the solution to a temperature of from approximately 0° C. to 30° C. or slightly above such as approximately 35° C., and, while stirring, add sulphuric acid either in one or several portions. The precipitate or precipitates formed are removed by filtration or centrifuging. The clear solution so obtained is washed with water and treated with a bleaching earth. The solvent is then distilled and a clear, light colored and practically odorless oil is obtained.

The quantity of sulphuric acid used in the above method is of great importance in obtaining precipitates rich in phytosterol and of such physical nature as to make their further processing for the recovery of pure phytosterol commercially attractive. If we react tall oil with the total quantity of acid required to obtain a certain color, let us say 10 per cent by weight of sulphuric acid on the weight of tall oil, we obtain a dark colored, viscous sludge which contains besides the major part of the sulphuric acid, the coloring matter, phytosterol, a large portion of polymerized products originating mostly from the unsaturated portion of the unsaponifiable matter and a minor portion of the reaction products of fatty and resin acids with sulphuric acid. Although the separation of the phytosterol from this sludge is a possibility, it is, on a practical scale, tedious and expensive.

We have discovered that if, instead of adding in one operation the total quantity of sulphuric acid required to obtain a certain color, we add the sulphuric acid in several minor portions and separate the precipitate after each addition, the different components of tall oil are precipitated in a certain order which makes possible a crude separation of one precipitated component from the other. The first component to be affected by the sulphuric acid is the coloring matter composed predominantly of oxy-resin acids. This is closely followed by the phytosterol. Only after the coloring matter and the phytosterol are precipitated, will the next portion of sulphuric acid attack and precipitate some of the residual unsaponifiable matter and a small portion of the unsaturated fatty acids and the resin acids. By effecting, therefore, the treatment with sulphuric acid in several stages instead of in one stage, we are enabled to precipitate the coloring matter and phytosterol together, separately and independently from other precipitated components. For instance, if we react a solution of a certain crude tall oil with approximately 2 to 4 per cent by weight of sulphuric acid as calculated on the weight of tall oil, we obtain a solid, light brown precipitate. This precipitate consists, besides the major quantity of the sulphuric acid, only of the coloring matter and phytosterol. If now this precipitate is separated from the solution and the same solution again reacted with sulphuric acid, then we obtain a dark brown, viscous liquid sludge which for the most part originates from the unsaturated hydrocarbon portion of the unsaponifiable matter, the removal of which enhances the value of the refined oil, and a minor portion of the reaction products of fatty and resin acids with sulphuric acid. Following this procedure, all of the phytosterol is contained in a relatively small quantity of precipitated matter, which greatly simplifies the process of recovering phytosterol in a pure form.

With crude tall oils of high oxy-resin acid content we can further decrease the bulk of the precipitate containing the phytosterol by first precipitating most of the oxy-resin acids, separating the precipitate from the solution and then treating the solution with sufficient sulphuric acid to include in the precipitate the remaining oxy-resin acids and the phytosterol.

We have found particularly that a certain critical proportion of sulphuric acid is required to make the precipitation of the coloring matter and phytosterol complete on the one hand, and prevent precipitation of undesirable sludge on the other hand. This proportion of sulphuric acid has to be determined by experiment and varies for oils from different sources.

As to the nature of the reaction involved in the precipitation of the coloring matter and phytosterol, we do not suggest a chemical mechanism. Both the coloring matter and the phytosterol are originally in solution in tall oil. On preparing a tall oil solution in a hydrocarbon solvent in the proportions specified in our aforementioned co-pending application, a small portion of the coloring matter is precipitated, but by far the larger part thereof and all the phytosterol remains in solution. On treating the tall oil solution with sulphuric acid, however, all the coloring matter and the phytosterol are precipitated. From the standpoint of our invention, it is immaterial whether, for example, the precipitation is due to the formation of insoluble addition compounds of the oxy-resin acids and phytosterol, respectively, with sulphuric acid, or whether under the influence of the sulphuric acid the oxy-resin acids and the phytosterol undergo an isomerization into a less soluble modification, etc.

The starting material for one specific embodiment of the process of our present invention is, as above indicated, the precipitate formed by adding to the tall oil solution an amount of sulphuric acid which is sufficient for complete precipitation of the coloring matter and phytosterol but not sufficient to precipitate an appreciable quantity of other sludge-forming components of the oil. This precipitate is most efficiently separated from the oil solution by centrifuging. To remove occluded oil we wash it with a small quantity of fresh petroleum solvent and obtain a precipitate which while still containing small quantities of unchanged oil and solvent, consists substantially of sulphuric acid, coloring matter and phytosterol, and it is one of the objects of the present invention to recover from such precipitate the contained phytosterol in a pure, crystalline form.

The problem in such recovery largely resolves itself into the separation of phytosterol from sulphuric acid, precipitated coloring matter (oxy-resin acids), and other impurities which may be present in small quantities such as unchanged tall oil, and fatty and resin acids occluded in the precipitate.

As a first step in this process, we remove the sulphuric acid by suspending the precipitate in a large quantity of cold water. This water treatment is repeated several times. Insuring proper agitation, the precipitate finally contains only a trace of sulphuric acid. Due to its high phytosterol content, the precipitate now has imbibed large quantities of water. Besides water the main constituents of the precipitate are now organic acids and phytosterol.

To those skilled in the art, it is well known that from such a mixture the phytosterol can be recovered by neutralizing the acidic components with alkali and separating the phytosterol from the solution of the resulting soaps by extraction with a water-immiscible solvent such as, for instance, a petroleum hydrocarbon, benzol or ether. The solvent is removed from the extract by distillation and the residue, if desired, crystallized in alcohol. This principle is utilized in the analytical determination of the unsaponifiable matter in fatty oils or fatty acids. As an analytical method, it is tedious and time-consuming. Its application on a large scale would be expensive and cumbersome, as in the course of the extraction an intimate contact between soap solution and solvent is essential and this would continually give rise to the formation of emulsions. Besides, an appreciable quantity of the soaps themselves is dissolved in the solvent used for removing the unsaponifiable matter.

Obviously, the formation of emulsion could be prevented if, after neutralizing the acid components with alkali, the water could be removed from the mixture. This is the underlying idea of United States Patent No. 1,940,372 to Sandqvist and Lindström. These inventors propose to dehydrate the "raw tall oil soap obtained in the manufacture of cellulose by the sulphate method," to dry it "at an extremely low pressure" and to extract it with a solvent (ether) to remove the unsaponifiable matter. The solvent is removed from the extract by distillation and the distillation residue crystallized from alcohol to obtain phytosterol. It is known to those skilled in the art that the drying of alkali soaps in the way proposed by these inventors is a difficult and expensive procedure, the more so as very large quantities of soap would have to be processed. The purity of the extract also leaves much to be desired and subsequent crystallizations of the phytosterol from alcohol are required.

By the process proposed herein, we have solved the problem of obtaining phytosterol in a much simpler manner. First, the small quantity of precipitate obtained in our refining process contains besides impurities substantially all the phytosterol originally present in a large quantity of oil. Second, we have devised an entirely novel and highly economical method for the separation of the phytosterol from the minor quantity of attending impurities and its final recovery in a pure, crystalline form.

We have found that by transforming the various organic acid components of the water-washed precipitate into their calcium salts, we obtain a porous solid from which the water can be easily removed and which then can be extracted with, and subsequently crystallized in, a low molecular weight alcohol which at higher temperature dissolves appreciable quantities of phytosterol, but is a poor solvent for the calcium salts. On cooling the extract, the phytosterol crystallizes and is removed by filtration.

According to our process the water-washed precipitate is treated with lime water containing a sufficient excess of lime to at least neutralize the organic acids present. This treatment is best effected by suspending the precipitate and the required quantity of hydrated lime in water and boiling for some time. After neutralization is complete, the precipitate can be easily filtered and most of the water removed. After a few hours drying in air the precipitate has the appearance of a grayish, porous solid. It is broken up into small pieces and extracted. We can increase the porosity of the dry precipitate considerably by mixing the water-washed precipitate intimately with a small quantity of kieselguhr, fuller's earth or any other fine, inert powder and then treating the resulting mixture with lime. While the addition of kieselguhr somewhat increases the bulk of the precipitate, the increased porosity is of great advantage in the extraction, since penetration of the precipitate by the solvent is facilitated and the extraction is finished in a shorter time than in the absence of kieselguhr.

We have devised an extraction apparatus which we use and which is built on the principle of the Soxhlet extractor where the total quantity of solvent is small and the matter to be extracted repeatedly comes in contact with freshly distilled solvent. By distilling the solvent into the extractor at a rapid rate, we can keep the temperature of the extractor sufficiently high to effect complete extraction in 20 to 40 hours.

The solvents we use for the extraction of the dry precipitate are low molecular weight alcohols, such as methyl-, ethyl-, or isopropyl alcohol. However, any other solvent may be used which dissolves the phytosterol, but which has substantially no solvent action on the balance of the precipitate. The alcohols dissolve only a small quantity of phytosterol at ordinary temperatures but dissolve several times such quantity at a temperature equal to or somewhat below their boiling point. For this reason, they are ordinarily used as crystallizing solvents for phytosterol. Their solvent action of the alcohols increases with their molecular weight, methyl alcohol being, even at its boiling point, a poor solvent for phytosterol. With the often-repeated action of fresh hot solvent, however, even methyl alcohol can be used advantageously for the extraction. For rapid extraction, we prefer the use of isopropyl alcohol which in the form of its constant boiling mixture with water is also an excellent crystallizing solvent for phytosterol.

The alcoholic extracts obtained are usually somewhat dark and contain traces of extracted lime salts and other impurities in solution. Most of the dissolved impurities can be removed from the boiling alcoholic solution by adding a small quantity of an acid such as, for instance, sulphuric or phosphoric acid, or even carbon dioxide and subsequent filtration of the hot solution. On cooling, the phytosterol crystallizes in white or light gray, well defined, acicular crystals. One more crystallization from isopropyl alcohol furnishes crystals of high purity and a melting point of 136–137.5° C.

The following example will illustrate our process and indicate our general procedure although our invention is not limited to the exact conditions of this example.

*Example*

Thirty pounds of precipitate obtained by treating a solution of 400 lbs. of tall oil from kraft paper manufacture from Southern pine woods, in naphtha with 12 lbs. sulphuric acid, is kneaded and agitated with 30 gallons of cold water. The water is drained off and the washing repeated several times until the wash water reacts only slightly acid. Four pounds kieselguhr are now intimately mixed with the soft waxy precipitate and the mixture boiled one hour in twenty gallons of water to which seven pounds of hydrated lime have been added. The precipitate is now filtered in a basket centrifuge and dried in air over night. Twenty-five pounds of dry, porous material is obtained which is extracted with hot isopropyl alcohol. The hot isopropyl alcohol solution is treated with 10 grams phosphoric acid, one-half lb. of kieselguhr added and filtered hot. On cooling the phytosterol crystallizes in almost white needles. One further crystallization yields four lbs. of pure white needle shaped crystals of phytosterol, melting point 137° C. The isopropyl alcohol from the first crystallization is recovered by distillation, that used for the second crystallization is charged into the extraction apparatus for the extraction of the following batch of precipitate.

As will be recognized, these conditions will vary with the starting material used as the precipitates obtained from different tall oils are likely to be of different composition. Also, deviations from the proportions indicated in the example will not materially affect the results. For example, the quantity of lime used should suffice to neutralize the acid compounds present, but whether we use an excess of lime of 10 or 50 per cent is immaterial. Neither do we limit our invention to the use of lime as neutralizing agent for the acid compounds accompanying the phytosterol since any other of the alkaline earth metal hydroxides, or even aluminum hydroxide could be used with the same result, the important feature of our process being the transformation of the acid components into salts which are substantially insoluble in the type of solvents referred to.

While most of our work was done with tall oil, our method of isolating phytosterol can be applied to any commercially promising source containing phytosterol in the free, unesterified state, whether such source be of natural occurrence as, for example, a vegetable oil, or a product obtained from a natural source, such as, for example, fatty acids which were obtained from glycerides by a splitting or saponification treatment so drastic that not only the glycerides but the sterol esters also suffered hydrolysis or saponification. The processing of such material for recovering phytosterol by the method disclosed herein would be fully equivalent to the recovery of phytosterol from tall oil as disclosed herein.

We claim as our invention:

1. The process of recovering phytosterol from a mixture thereof with oxy-resin acids, comprising converting the oxy-resin acids into their alkaline earth salts and extracting the phytosterol therefrom.

2. The process of recovering phytosterol from a mixture comprising essentially phytosterol and oxy-resin acids, which comprises reacting the mixture with an alkaline earth base and extracting the phytosterol.

3. The process of recovering phytosterol from a mixture of phytosterol and oxy-resin acids, comprising reacting the mixture in water with an alkaline earth base, removing the water and extracting the phytosterol.

4. The process of recovering phytosterol from a mixture of phytosterol and oxy-resin acids, comprising reacting the mixture in water with hydrated lime, removing the water and extracting the phytosterol.

5. The process of recovering phytosterol from a sludge concentrate comprising essentially phytosterol and oxy-resin acids together with minor percentages of fatty and resin acids, which comprises treating said sludge to convert the fatty, resin and oxy-resin acids thereof into their alkaline earth salts and thereafter extracting the phytosterol therefrom.

6. The process of recovering phytosterol from a mixture of phytosterol, fatty, resin and oxy-resin acids, comprising converting the fatty, resin and oxy-resin acids into their alkaline earth salts and extracting the phytosterol with a solvent which is substantially a non-solvent for said alkaline earth salts.

7. The process of recovering phytosterol from a mixture comprising essentially phytosterol and oxy-resin acids, which comprises converting the oxy-resin acids into their alkaline earth salts and extracting the phytosterol therefrom with a low molecular weight aliphatic alcohol.

8. The process of recovering phytosterol from a mixture comprising essentially phytosterol and oxy-resin acids, which comprises converting the oxy-resin acids into their alkaline earth salts and extracting the phytosterol therefrom with isopropyl alcohol.

9. The process of recovering and isolating phytosterol from tall oil, comprising treating tall oil with a limited quantity of sulphuric acid sufficient to precipitate the coloring matter and the phytosterol at a temperature of from approximately 0° to 35° C., removing the precipitate from the oil, washing the precipitate with water to remove sulphuric acid, treating the washed precipitate with an alkaline earth base to neutralize acid compounds contained therein and thereafter extracting the phytosterol with a solvent.

10. In the process of recovering phytosterol from the precipitate obtained in treating tall oil at a temperature of from approximately 0° to 35° C. with sulphuric acid in a quantity and of a strength sufficient to precipitate substantially only the petroleum insoluble coloring matter and completely removing the sulphuric acid from the phytosterol, the steps consisting of substantially precipitate, reacting the remaining mixture with an alkaline earth base to neutralize the acidic compounds thereof, and thereafter extracting the phytosterol.

FREDERICK H. GAYER.
CHARLES E. FAWKES.

CERTIFICATE OF CORRECTION.

Patent No. 2,245,346.  July 8, 1941.

FREDERICK H. GAYER, ET AL.

It is hereby certified that error appears in the printed specification of the above numbered patent requiring correction as follows: Page 4, second column, line 14, claim 10, strike out the words "phytosterol, the steps consisting of substantially" and insert the same before "completely" in line 13, same claim; and that the said Letters Patent should be read with this correction therein that the same may conform to the record of the case in the Patent Office.

Signed and sealed this 5th day of August, A. D. 1941.

(Seal)

Henry Van Arsdale,
Acting Commissioner of Patents.